United States Patent
Witte et al.

(10) Patent No.: US 6,650,445 B1
(45) Date of Patent: Nov. 18, 2003

(54) OPTICAL SCANNER PROVIDING COMPENSATION FOR NON-UNIFORM BULB ILLUMINATION

(75) Inventors: Stephen B. Witte, Poway, CA (US); Mark A. Flores, San Diego, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/399,203

(22) Filed: Sep. 17, 1999

(51) Int. Cl.[7] .............................. H04N 1/46; H04N 1/04
(52) U.S. Cl. .................... 358/509; 358/504; 358/475; 358/406; 358/474; 358/497
(58) Field of Search ................. 358/446, 475, 358/509, 505, 504, 406, 474, 497, 494, 461, 483; 382/274

(56) References Cited

U.S. PATENT DOCUMENTS

| | | | | |
|---|---|---|---|---|
| 4,974,098 A | * | 11/1990 | Miyakawa et al. | 358/406 |
| 4,974,810 A | * | 12/1990 | Fiske | 250/216 |
| 5,208,874 A | * | 5/1993 | Omura | 358/483 |
| 5,223,951 A | * | 6/1993 | Umakoshi | 358/447 |
| 5,570,204 A | * | 10/1996 | Kumashiro | 358/471 |
| 5,995,247 A | * | 11/1999 | Bradburn | 358/483 |

* cited by examiner

*Primary Examiner*—Cheukfan Lee (57) ABSTRACT

An optical scanner includes a CCD and a light monitor window ("LMW") and a black region adjacent the LMW. The LMW is imaged to provide feedback signals for Red, Green and Blue channels of the CCD. The black region is imaged to remove flare from the feedback signals. The flare-corrected feedback signals may be supplied to gain compensation controls.

12 Claims, 6 Drawing Sheets

OPTICAL SCANNER PROVIDING COMPENSATION FOR NON-UNIFORM BULB ILLUMINATION

BACKGROUND OF THE INVENTION

The invention relates to imaging devices. More specifically, the invention relates to the compensation of non-uniform illumination provided by a bulb of an optical scanning device.

Commercial scanning products include flatbed scanners, scroll-fed scanners, hand-fed scanners, color copiers, fax machines and all-in-one multi-function products. The all-in-one products, which combine a scanning module with a printing module, can typically perform printing, scanning, faxing and copying. A typical commercial scanning product includes a bulb for applying illumination to an image to be captured, and imaging optics and a charge-coupled device ("CCD") for capturing light reflected by the illuminated image.

Image quality depends upon the quality of the CCD and the quality of the imaging optics. The image quality also depends upon the quality of the bulb that illuminates the target area.

Perhaps the most variable and unpredictable element of the image capture is the bulb. Even if a constant input voltage is applied to the bulb, the brightness and color characteristics of the illumination can vary according to bulb temperature and other factors.

Xenon bulbs, hot cathode fluorescent bulbs and cold cathode fluorescent bulbs are typically considered for use in scanning products. Many scanner manufacturers prefer the cold cathode fluorescent bulbs over the Xenon bulbs and hot cathode fluorescent bulbs because the cold cathode fluorescent bulbs are less expensive and brighter.

However, scanner manufacturers are faced with considerations other than cost and brightness. Other important considerations include bulb longevity, power consumption and heat dissipation.

Bulb longevity can be increased, and power consumption and heat dissipation can be reduced, by turning off the bulb between scans or by supplying only a trickle current to the bulb between scans. However, if the bulb is turned off or if the trickle current is supplied to keep the bulb at a low level, the bulb is allowed to warm up after a new scan is commanded.

Xenon bulbs and hot cathode fluorescent bulbs typically warm up quickly; therefore, relatively little time would elapse if a scan commences at the end of the warm-up period. Cold cathode fluorescent bulbs, on the other hand, could take much longer to warm up. Waiting for a cold cathode fluorescent bulb to warm up could create an undesirably long waiting period. Therefore, the scanning usually commences during warm up, after a bulb shape has formed.

As scanning is being performed during bulb warm up, the intensity and spectrum of the illumination can drift. Therefore, compensation is performed to correct the drift in intensity and spectrum. The compensation is typically performed by adjusting bulb voltage and gain of the CCD's color channels.

The compensation is also performed after the bulb has warmed up, since drifts in intensity and color spectrum of the bulb can still occur. This is especially true for the cold cathode fluorescent bulbs.

The compensation should be accurate; otherwise, image quality and image capture accuracy will suffer. The compensation should also be relatively inexpensive to perform; otherwise, the cost of the scanning product will be increased. Manufacturers of high volume, low profit margin scanning products do not have the luxury of passing on cost increases to their customers. Even a seemingly trivial cost increase can significantly reduce the profitability of a product line in which millions of units are sold per year.

SUMMARY OF THE INVENTION

The invention may be regarded as an optical scanning system including a target area; a light monitor window ("LMW"); a black region adjacent the LMW; and a bulb for illuminating the target area, the LMW and the black region. The optical scanning system further includes a photodetector having a field of view. The target area is within the field of view between margins areas of the photodetector. The LMW and the black region are within the field of view inside a margin area of the photodetector.

The LMW and the black region, which may be a tab, a strip or a black-colored portion of a scan head body, may be used to accurately compensate for non-uniform illumination of the bulb. The accurate compensation, in turn, improves image quality and image capture accuracy.

Other aspects and advantages of the present invention will become apparent from the following detailed description, taken in conjunction with the accompanying drawings, illustrating by way of example the principles of the present invention.

DETAILED DESCRIPTION OF THE INVENTION

As shown in the drawings for purposes of illustration, the present invention is embodied in an optical scanner. The scanner includes a light monitor window ("LMW") and a black region adjacent the LMW. The LMW is illuminated by a scanner bulb, an image of the LMW is captured, and the image of the LMW is processed to determine bulb intensity. However, the LMW image can include two components: a first component contributed by direct illumination from the bulb, and a second component contributed by light that is reflected onto, the LMW by an image in the target area. This second component will hereinafter be referred to as "flare." The flare is usually caused by odd color combinations (e.g., blues and yellows) in the image in the target area.

The black region is provided to remove the flare. The black region is also illuminated by the scanner bulb, an image of the black region is captured, and the image of the black region is processed to determine the amount of flare. The flare, as measured by the black region, can then be removed from the illumination measured by the LMW to provide an accurate indication of bulb intensity. This accurate indication of bulb intensity can then be used by bulb intensity and gain controls of the scanner. If the flare went uncorrected, the measured bulb intensity would appear to be brighter than it really was, and bulb intensity and gain would be reduced to accommodate the higher brightness. Image quality and image capture accuracy would suffer. Therefore, using the black region to correct for flare improves image quality and image capture accuracy. Additionally, the flare can be corrected with relatively little to no increase in cost of the scanner.

Figure 1:
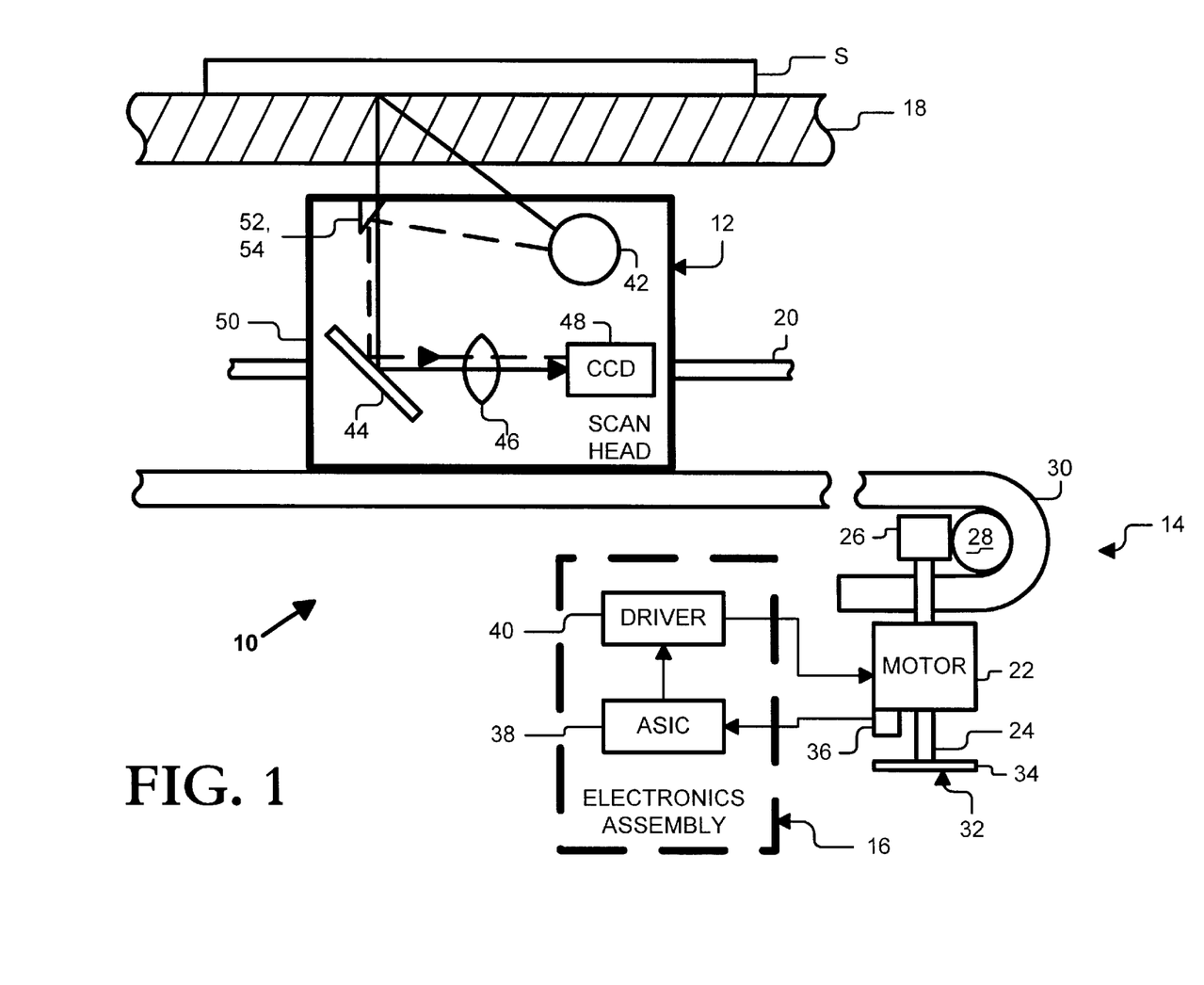
FIG. 1 is an illustration of a flatbed scanner according to the present invention.

Reference is now made to FIG. 1, which shows a flatbed scanner 10. The flatbed scanner 10 includes a scan head 12, a motor drive assembly 14, an electronics assembly 16, a glass pane 18 and a housing (not shown). The glass pane 18 and the housing form an enclosure inside which the scan head 12, the motor drive assembly 14 and the electronics assembly 16 are mounted.

The motor drive assembly 14 includes a slider rod 20 and rail (not shown) for guiding the scan head 12 in a linear direction along the glass pane 18, and a stepper motor 22 and transmission for moving the scan head 12 along the slider rod 20. The transmission may include a motor shaft 24 for turning spur gears 26 and 28 that drive timing belt 30. The timing belt 30 moves the scan head 12. The motor 22 turns the motor shaft over a number of revolutions to move the scan head 12 an inch along the slider rods 20.

The motor drive assembly 14 further includes an encoder 32 including an encoder wheel 34 and an encoder assembly 36. The encoder wheel 34 is secured concentrically to an opposite end of the motor shaft 24 and rotates jointly with the motor shaft 24. In a typical shaft encoder 32, each pulse outputted by the encoder represents a relative incremental rotation of the encoder wheel 34.

The electronics assembly 16 includes an application specific integrated circuit ("ASIC") 38 and a motor driver 40 such as an H-bridge motor driver. The driver 40 has an input that is adapted to receive pulse width modulated ("PWM") signals from a motion controller/speed controller on the ASIC 38. The PWM signals cause the motor driver 40 to selectively energize field windings of the motor 22 to create a motor torque. The PWM signals can cause the motor 22 to rotate the shaft 24 in either a clockwise or counterclockwise direction.

To scan a sheet S of paper, the sheet S is positioned atop the glass pane 18, and the electronics assembly 16 is commanded to begin a scanning operation. Under control of the ASIC 38, the motor drive assembly 14 moves the scan head 12 along the slider rod 20 to a known position (e.g., a wall) and then starts moving the scan head 12 along the slider rod 20.

Figure 1A:
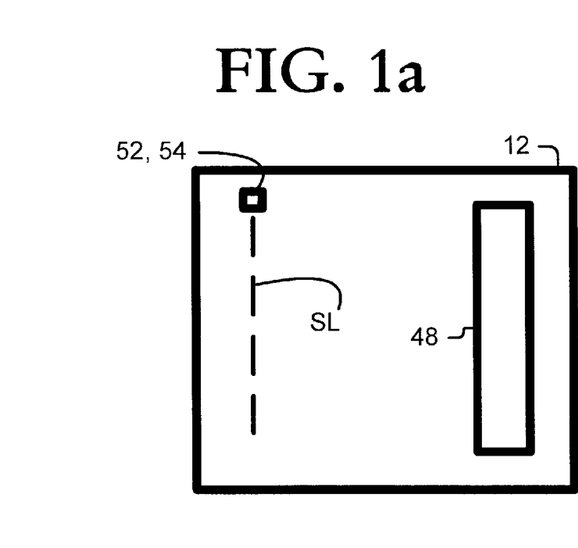
FIG. 1a is an illustration of a scan head relative to a target area.
Figure 2:
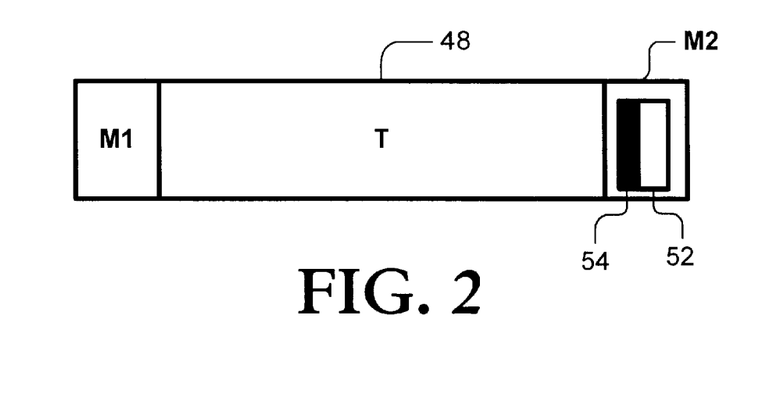
FIG. 2 is an illustration of a CCD for the scanner, the CCD including target and margin areas.

Additional reference is made to FIG. 2. A fluorescent bulb 42 of the scan head 12 is turned on to illuminate a portion of the sheet S with white light. The fluorescent bulb 42 may be a cold cathode fluorescent bulb. An optics assembly 44, 46 focuses an image of the illuminated portion onto a target area T of a charge coupled device ("CCD") 48. The target area T is between margin areas M1 and M2 of the CCD 48. The CCD 48 is exposed to, and integrates, at least one line of pixels at a time; and the electronics assembly 16 processes signals generated by the CCD 48 and sends the processed signals to a host (e.g., a host computer). The bulb 42, the optics assembly 44 and 46, and the CCD 48 are all enclosed within a scan head body 50. The entire sheet S is scanned, line-by-line, as the scan head 12 is moved along the slider rod 20. A scan line SL is shown in FIG. 1a.

The fluorescent bulb 42 also illuminates an LMW 52, which may be secured to the scan head body 50 or the glass pane 18. As can be seen from FIG. 1a, the LMW 52 lies on a scan line SL and is off an edge of the target area T. The LMW 52 is focused by the lens assembly 44, 46 onto the CCD 48 in one of the margin areas M1 or M2. Reflected light rays from the target area T and the LMW 52 are roughly coincident. The LMW 52 is placed at an angle relative to the bulb 42 so that the LMW 52 is illuminated with about 60% to 90% of maximum bulb intensity.

The fluorescent bulb 42 also illuminates a black region 54 adjacent to the LMW 52. The black region 54 will hereinafter be referred to as a black monitor window 54 or "BMW" 54. As with the LMW 52, the BMW 54 is focused by the lens assembly 44, 46 onto the CCD 48 in one of the margin areas M1 or M2, and the BMW 54 is placed at an angle relative to the bulb 42 so that the BMW 54 is illuminated with about 60% to 90% of maximum bulb intensity. Preferably, the BMW 54 is between the LMW 52 and the target area T.

The ASIC 38 processes images of the LMW 52 and BMW 54 to generate light intensity feedback signals that have been corrected for flare. The corrected feedback signal may be used by the ASIC 38 to control intensity of the fluorescent bulb 42. The ASIC 38 may also use the feedback signal to control CCD channel gain.

Size of the LMW 52 and the BMW 54 depend, in part, upon how well these windows 52 and 54 are focused onto the CCD 48. The windows should be of sufficient size to create strong CCD signals. The more out-of-focus a window is, the larger the window should be to provide a strong signal.

Figure 3A:
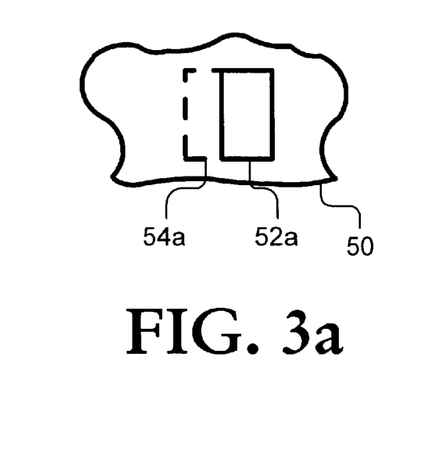
FIG. 3a is an illustration of a first embodiment of a light monitor window and a black region adjacent the light monitor window.
Figure 3B:
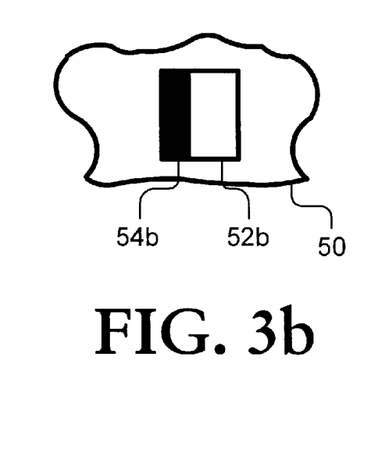
FIG. 3b is an illustration of a second embodiment of a light monitor window and a black region adjacent the light monitor window.
Figure 3C:
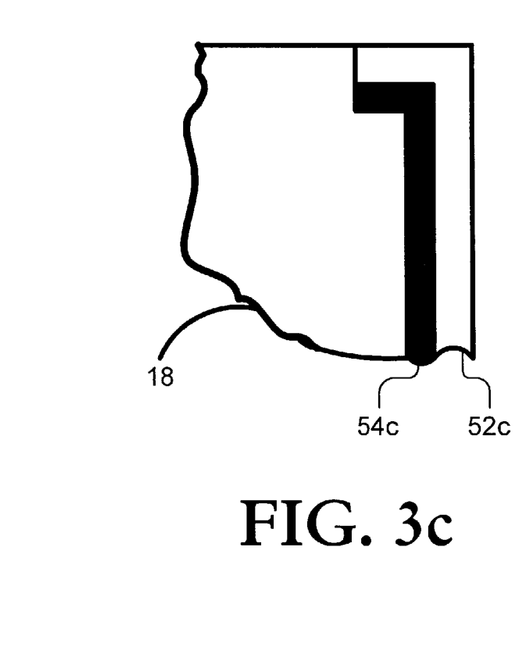
FIG. 3c is an illustration of a third embodiment of a light monitor window and a black region adjacent the light monitor window.

FIGS. 3a to 3c show different embodiments of the LMW 52 and the BMW 54. FIG. 3a shows an LMW 52 in the form of a tab 52a on the scan head body 50. The tab 52a may be formed integrally with the scan head body 50, removably attached to the scan head body 50, etc. The tab 52a has a white surface that can reflect light from the bulb 42. Such a tab 52a is described in detail in assignee's U.S. Ser. No. 08/986,122 filed Dec. 5, 1997, which is incorporated herein by reference.

A portion 54a of the scan head body 50 that is black can provide the BMW 54. This portion 54a is indicated by dashed lines. For example, a scan head body 50 that is made of black molded plastic can provide the BMW 54.

FIG. 3b shows the LMW 52 in the form of a first tab 52b (which may be identical to the tab 52a shown in FIG. 3a) and a second tab 54b having a black surface that provides the BMW 54. The second tab 54b may have the same construction as the first tab 52a (except for a black surface), and it may be formed integrally with the scan head body 50, removably attached to the scan head body 50, formed integrally with the first tab 52b, etc.

FIG. 3c shows the LMW 52 and the BMW 54 in the form of L-shaped white and black strips 52c and 54c that are located on an underside of the glass pane 18. The L-shaped strips 52c and 54c may be made of ink that is silkscreened directly onto the glass pane 18. In the alternative, the strips 52c and 54c may be made of paint, labels or plastic strips. The L-shaped strips 52c and 54c may be hidden from top view by plastic border that is used for indicating sheet position on the glass pane 18. Length of each strip 52c and 54c covers at least the distance that the scan head 12 travels.

Actual location of the LMW 52 and the BMW 54 will be device-dependent. Actual dimensions of the LMW 52 and BMW 54 will also be device dependent.

Figure 4:
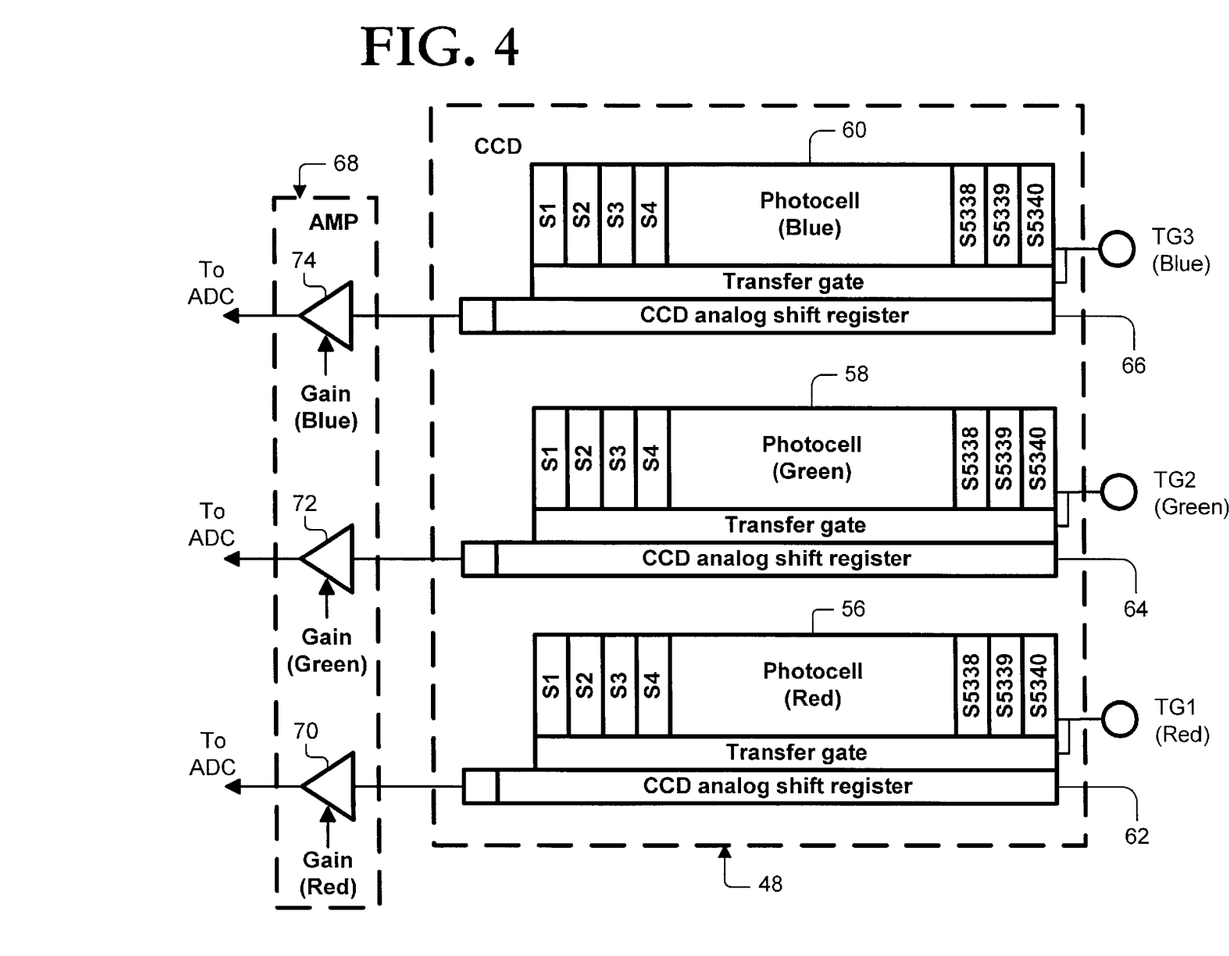
FIG. 4 is an illustration of the CCD.

Reference is now made to FIG. 4, which shows the CCD 48 in greater detail. The CCD 48 has a Red channel including a first row of photodiodes 56 sensitive to red light, a Green channel including a second row of photodiodes 58 sensitive to green light, and a Blue channel including a third row of photodiodes 60 sensitive to blue light. Transfer gate and CCD analog shift register 62, 64 and 66 are provided for each channel. The transfer gate provides a shutter control for the CCD 48.

Each channel is adapted to receive a transfer gate signal TG1, TG2 and TG3. When a transfer gate signal TG1, TG2 or TG3 is de-asserted, the photodiodes 56, 58 or 60 accumulate charge. When the transfer gate signal TG1, TG2 or TG3 is asserted, the charge accumulated by the photodiodes 56, 58 or 60 is transferred to the analog shift register 62, 64 or 66. The analog shift register 62, 64 or 66 then serially reads out the charges to one of three programmable gain amplifiers 70, 72 and 74 on an amplifier chip 68. Analog outputs of the programmable gain amplifiers 70, 72 and 74 are then A/D converted and sent to the host.

The three channels are processed in parallel. Additionally, while the contents of the shift registers 62, 64 and 66 are being shifted out and processed, the photodiodes 56, 58 and 60 are accumulating charges for the next line of pixels. When the next transfer gate signal TG1, TG2 or TG3 is asserted, the contents of the photodiodes 56, 58 and 60 are transferred to the analog shift registers 62, 64 and 66.

The CCD 48 may have any number of pixels. FIG. 4 happens to show a CCD 48 having 5540 pixels (that is, 5540 photodiodes for each color channel). Of those 5540 pixels, about 150 may be reserved for the margin areas M1 and M2, and the remaining pixels may be reserved for the target area T.

Figure 5:
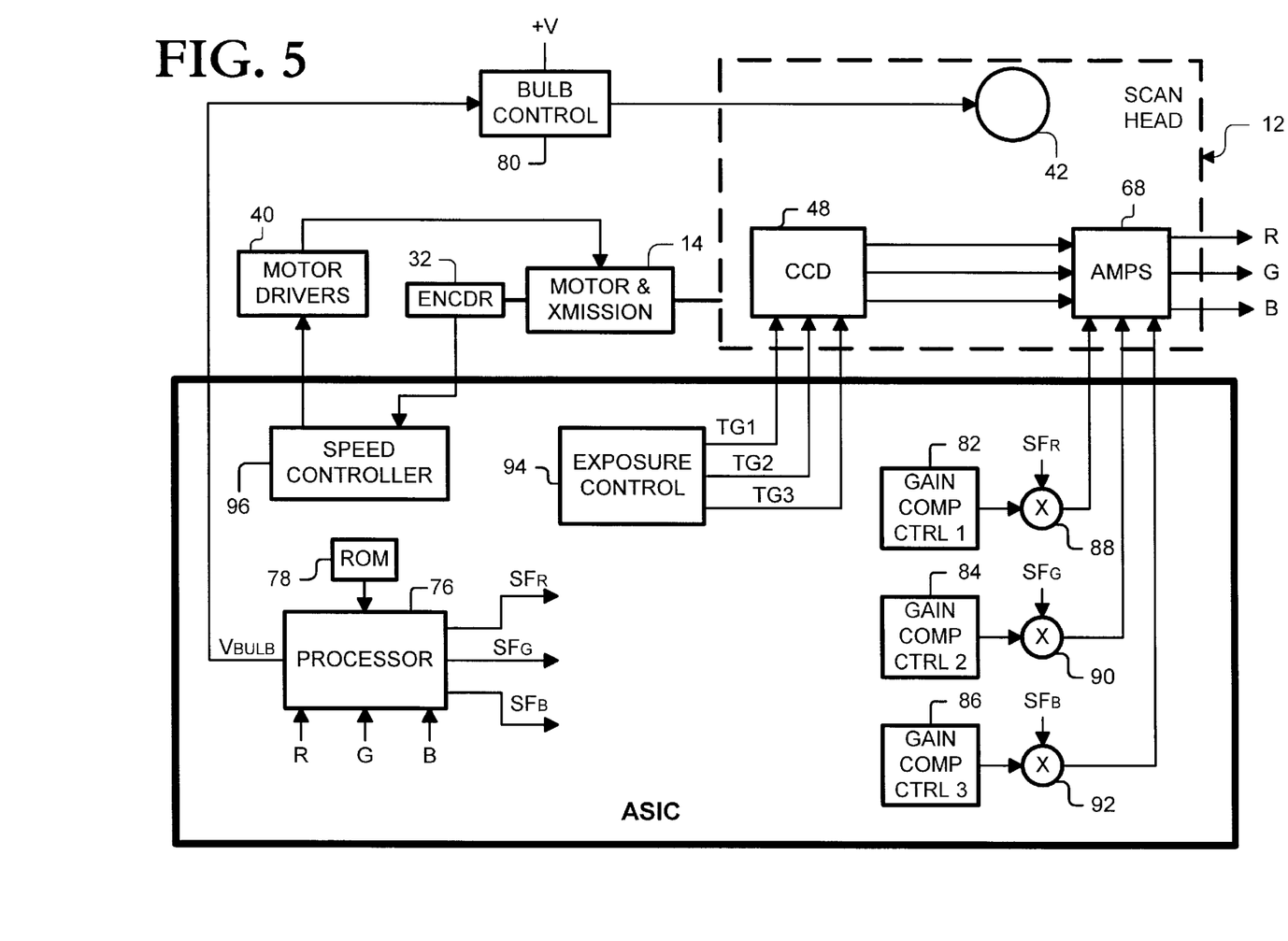
FIG. 5 is an illustration of an ASIC for the scanner.

Reference is now made to FIG. 5, which shows the ASIC 38 in greater detail. The ASIC 38 includes an embedded processor 76 and read-only memory ("ROM") 78. The ROM 78 stores a real-time operating system for the embedded processor 76. The ROM 78 also stores instructions for instructing the embedded processor 76 to perform I/O functions and perform the general control of the scanner 10.

Among its general control functions, the embedded processor 76 receives the RGB output of the amplifiers 68, extracts images of the LMW 52 and the BMW 54, and processes the images to generate a feedback signal $I_R$ indicating intensity of the Red channel, a feedback signal $I_G$ indicating intensity of the Green channel, and a feedback signal $I_B$ indicating intensity of the Blue channel. The embedded processor 76 also generates a bulb signal $I_{BULB}$ (not shown) as the maximum of the three channel feedback signals $I_R$, $I_G$ and $I_B$. That is, $I_{BULB}$=Max($I_R$, $I_G$, $I_B$). These signals $I_R$, $I_G$, $I_B$ and $I_{BULB}$ are internal to the embedded processor 76 and are not shown.

The embedded processor 76 uses the feedback signals $I_R$, $I_G$ and $I_B$ to correct gains provided by first, second and third gain compensation controls 82, 84 and 86, which gain compensation controls may be of conventional design. For instance, the first gain compensation control 82 stores gains corresponding to the pixels in the Red channel. When a pixel in the Red channel of the CCD 48 is being read out to the first programmable gain amplifier 70, the first gain control unit 82 supplies a gain corresponding to that pixel to the programmable gain amplifier 70 of the Red channel. Similarly, the second gain compensation control 84 provides gains to the second programmable gain amplifier 72 for the pixels in the Green channel, and the third gain compensation control 86 provides gains to the third programmable gain amplifier 74 for the pixels in the Blue channel.

The gains are globally corrected by elements 88, 90 and 92, which multiply the gains by scale factors $SF_R$, $SF_G$ and $SF_B$ provided by the embedded processor 76. Each scale factor $SF_R$, $SF_G$ and $SF_B$ may be determined as follows $$SF_R = E_R/I_R$$
$$SF_G = E_G/I_G$$
$$SF_B = E_B/I_B$$

where $E_R$, $E_G$, and $E_B$ are the expected intensities of the LMW 52 in the Red, Green and Blue channels. Thus, the scale factors $SF_R$, $SF_B$ and $SF_G$ are computed as ratios of expected-to-measured intensity.

The embedded processor 76 also supplies a bulb voltage command $V_{BULB}$ to a bulb control 80 (which may be on a printed circuit assembly). The bulb control 80 may have a conventional design. For instance, the bulb control 80 may include a closed loop control and an inverter. The closed loop control can command the inverter to change bulb voltage until bulb intensity reaches the commanded value. The inverter can change the bulb voltage between, for example, 7 and 14 volts over 4096 levels. The bulb control 80 can also be operated in an open loop. The embedded processor 76 can update the bulb command $V_{BULB}$ to change the intensity of the bulb 42.

When a scan is commanded (e.g., by a host computer), the embedded processor 76 responds by setting the gains to fixed values and commanding the inverter of the bulb control 80 to quickly ramp up the bulb voltage. When a current is first applied to the fluorescent bulb 42, the ends of the bulb 42 light up. As the bulb warms up, the illumination works its way towards the center.

Once the bulb shape becomes stable and the scanning operation begins, the embedded processor 76 commands the bulb control 80 to hold the bulb voltage at a constant value. As the bulb 42 continues to warm up and increase in brightness, the embedded processor 76 takes advantage of the increasing light level to improve the signal-to-noise ratio of the CCD 48. The embedded processor 76 uses the channel intensity signals $I_R$, $I_G$ and $I_B$ to correct the gains. However, the embedded processor 76 limits the bulb intensity to avoid saturating the inputs to the programmable gain amplifiers 70, 72 and 74.

The bulb signal $I_{BULB}$ is used to prevent a channel from saturating. If the bulb signal $I_{BULB}$ indicates that a channel is reaching saturation, the embedded processor 76 will command the closed loop control 80 to reduce the voltage applied to the bulb 42.

Once the bulb 42 has warmed up (that is, reached a steady state light level), the embedded processor 76 continues to use the feedback signals $I_R$, $I_G$ and $I_B$ to control bulb intensity and amplifier gains. Throughout the remainder of the scan, both bulb voltage and gain are adjusted using the feedback signals $I_R$, $I_G$ and $I_B$.

The embedded processor 76 may also use the bulb intensity signal $I_{BULB}$ to determine when the bulb shape has stabilized. For example, the embedded processor 76 could monitor specific pixels along the LMW 52. Stabilization could be deemed to occur when these pixels all change at the same rate of intensity. Stabilization schemes are disclosed in assignee's U.S. Pat. No. 5,907,742.

The embedded processor 76 may also be programmed to implement a motion controller. The motion controller may be an open or closed loop control that accelerates the scan head 12 to a scan speed and maintains the scan speed at a relatively constant speed during a scan operation.

The ASIC 38 further includes a conventional exposure control 94, which adjusts the exposure time of the CCD 48. The exposure control 94 generates the transfer gate signals TG1, TG2 and TG3 for the CCD channels. To scan a line, the exposure control de-asserts the transfer gate signals TG1, TG2 and TG3 to begin an exposure time and then asserts the transfer gate signals TG1, TG2 and TG3 to stop the exposure time.

The ASIC 38 also includes a speed controller 96 that controls slew rate of the motor 22. Performing the speed control using the ASIC 38 instead of the embedded processor 76 reduces the processing burden on the embedded processor 76 and frees it up to perform other functions.

Figure 6:
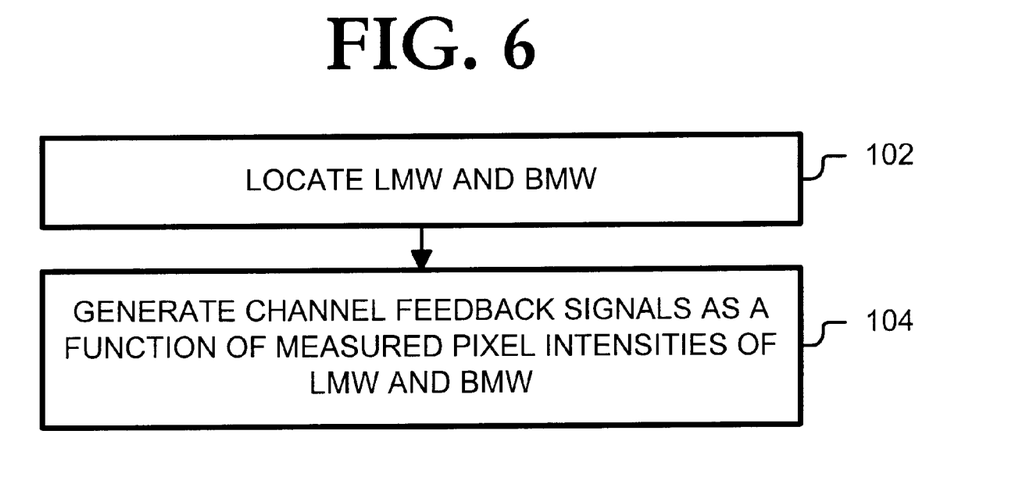
FIG. 6 is an illustration of steps performed by an embedded processor included in the ASIC.

Reference is now made to FIG. 6, which shows steps that the embedded processor 76 performs to generate the feedback signals $I_R$, $I_G$ and $I_B$. The embedded processor 76 locates images of the LMW 52 and the BMW 54 (block 102). The embedded processor 76 may identify those pixels imaging the LMW and the black region by using the same fixed pixels, provided that error tolerances do not build up in the hardware assembly. For example, pixels S5290 to S5300 could always be used to image the BMW 54, and pixels S5310 to S5320 could always be used to image the LMW 52.

In the alternative, the embedded processor 76 may identify those pixels imaging the LMW 52 and the BMW 54 by starting with a pixel imaging the BMW 54 and then, pixel by pixel, searching for the first pixel where the light level jumps. This first pixel identifies the transition of the BMW 54 to the LMW 52.

The embedded processor 76 then generates the feedback signals $I_R$, $I_G$ and $I_B$ as a function of $V_w$ and $V_b$, where $V_w$ is a measured pixel intensity of the imaged LMW 52, and $V_b$ is a measured pixel intensity of the BMW 54 (block 104). The measured pixel intensity $V_w$ of the LMW 52 may be taken as the average of the group of pixels imaging the LMW 52. Similarly, the measured pixel intensity $V_b$ of the BMW 54 may be taken as the average of the group of pixels imaging the BMW 54.

Figure 7:
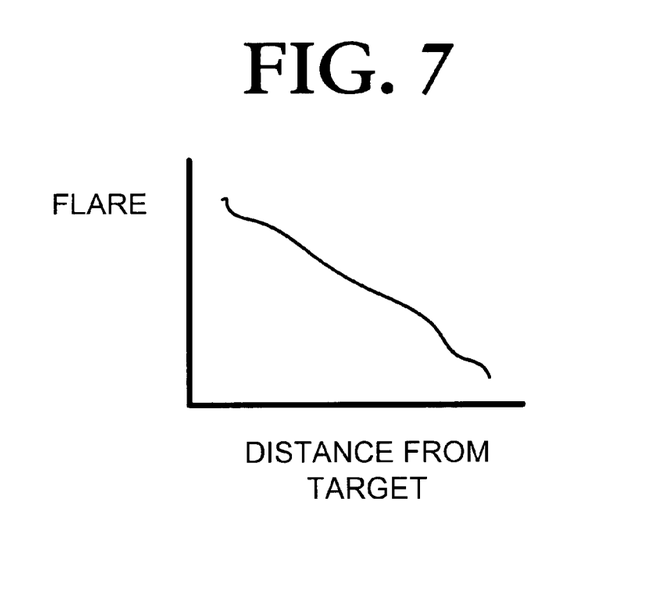
FIG. 7 is an illustration of flare drop off as a function of distance from a target area of the CCD.

The feedback signals $I_R$, $I_G$ and $I_B$ may be generated from the following equation:

$$I_R = [aV_w - bV_b]_{RED}$$

$$I_G = [aV_w - bV_b]_{GREEN}$$

$$I_B = [aV_w - bV_b]_{BLUE}$$

where a and b are experimentally determined coefficients. Different pairs of coefficients a and b may be determined for each color channel. These equations account for a drop off in flare as distance from the target area T is increased (see FIG. 7). Thus, the flare becomes less significant on the LMW 52 as distance from the target area T is increased. A range of values for the coefficients a and b are $0.5 < a < 3$ and $0.5 < b < 3$. If there was no drop off, then $a = b = 1$. The coefficients a and b may be determined after the scanner configuration (e.g., geometry of scan head, optics) has been determined. Once the scanner configuration has been determined, an open loop test with the bulb warmed up may be performed. A high contrast image (black/white or blue/yellow) is scanned and the coefficients a and b are adjusted until compensation is deemed satisfactory. Production units would be shipped with fixed coefficients a and b.

Figure 8:
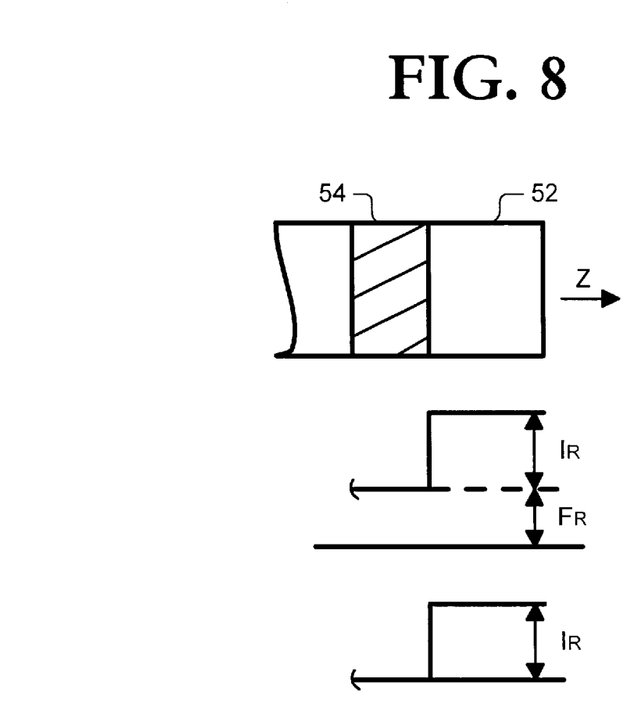
FIG. 8 is an illustration of flare removal from a feedback signal indicating bulb intensity.

The generation of the feedback signal $I_R$ for the Red channel is illustrated in FIG. 8. Coefficients $a = b = 1$ are assumed. Lines of pixels are read out in the direction indicated by the arrow Z. When the pixels imaging the BMW 54 are read out, the pixel intensity at level $F_R$ provides a measure of flare in the Red channel. When the pixels corresponding to the LMW 52 are read out, the pixel intensity increases to reflect a measure of Red channel intensity as well as the Red channel flare $F_R$. Removal of flare provides an accurate feedback signal $I_R$ for the Red channel.

The invention has been described in connection with a flatbed scanner. However, it is not so-limited. Other applications of the present invention include, but are not limited to low cost commercial scanning products such as scroll-fed scanners, copiers, fax machines, and all-in-one multi-function products.

Specific embodiments of the invention have been described and illustrated above. However, the invention is not limited to these specific embodiments. The LMW is not limited to a tab or strip having a white reflective surface. For example, the reflective surface could be a light gray.

The invention is not limited to compensation of all three color channels. Correction of a single color channel could be performed. For example, only the Red channel could be corrected by using an LMW that is red. In the alternative, black/white compensation could be performed.

A detector other than a CCD could be used. Other types of detectors that could be used include CMOS detectors and active pixel sensors. If the detector is an active pixel sensor, the exposure control system would not include a transfer gate generator.

There will also be design considerations that depend upon factors such as the quality and cost of the scanner. For example, gains can be digital or analog and they can be applied in the scanner or a host.

Therefore, the invention is not limited to the specific embodiments described above. Instead, the invention is construed according to the claims that follow.

What is claimed is:

1. An Optical Scanning system comprising:
   a target area;
   a light monitor window (LMW);
   a black region adjacent to the LMW;
   a bulb for illuminating the target area, the LMW and the black region; and
   a photodetector having a field of view, the target area being within the field of view between margin areas of the photodetector, the LMW and the black region being within the field of view inside a margin area of the photodetector; and
   a scan head body; wherein the LMW includes a tab on the scan head body, and wherein the scan head body provides the black region.

2. The scanning system of claim 1, wherein the black region is in between the LMW and the target area.

3. The scanning system of claim 1, further comprising a glass pane; wherein the LMW includes a first strip on the glass pane; and wherein the black region is provided by a second strip on the glass pane.

4. The scanning system of claim 1, wherein the target area, the LMW and the black region are focused on the photodetector.

5. The scanning system of claim 1, wherein the bulb is a cold cathode fluorescent bulb.

6. An optical scanning system comprising:

a target area;

an light monitor window (LMW);

a black region adjacent the LMW;

a bulb for illuminating the target area, the LMW and the black region;

a photodetector having a field of view, the target area being within the field of view between margin areas of the photodetector, the LMW and the black region being within the field of view inside a margin area of the photodetector; and a scan head body; wherein the LMW includes a first tab on the scan head body; and wherein the black region is provided by a second tab on the scan head body.

7. An optical scanning system comprising:

a target area;

an light monitor window (LMW);

a black region adjacent the LMW;

a bulb for illuminating the target area, the LMW and the black region;

a photodetector having a field of view, the target area being within the field of view between margin areas of the photodetector, the LMW and the black region being within the field of view inside a margin area of the photodetector; and a processor for processing the photodetector images of LMW and the black region, the processor for processing photodetector images of the LMW and the black region, the processor using the LMW images to generate at least one feedback signal indicating color channel intensity, the processor using the images of the black region to perform flare correction of at least one feedback signal.

8. The scanning system of claim 7, wherein further comprising means for locating the LMW and the black region within the margin area prior to generating a feedback signal.

9. The scanning system of claim 7, wherein each feedback signal is determined as a function of average pixel intensity in the LMW images and average pixel intensity in the black region images.

10. The scanning system of claim 7, wherein the feedback signal X of a color channel is determined by $$X = aV_w - bV_b$$

Where $V_w$ is a measured pixel intensity of the images LMW, $V_b$ is a measured pixel intensity of the imaged black region, and a and b are experimentally determined coefficients.

11. A chip for generating a feedback signal indicating intensity of illumination from a bulb of an optical scanner, the optical scanner including and imaging device, a light region of known color and black region, the chip comprising:

a processor, responsive to an output of the imaging device, for determining light intensities in images of the light and black regions;

the processor using images of the light regions to provide at least one feedback signal indicating color channel intensity;

the processor using images of the black region to remove flare from at least one feedback signal, wherein the feedback signal X of a color channel is determined by $$X = aV_w - bV_b$$

where $V_w$ is measured pixel intensity in the light region images, Vb is measured pixel intensity in the black region images, and a and b are coefficients.

12. A method of compensating for non-uniform illumination in an optical scanner, the optical scanner including a bulb, a light region of known color and a black region, the method comprising the steps of:

using the bulb to illuminate the black and light regions;

generating images of the illuminated light and black regions;

using images of the light region to provide at least one feedback signal indicating color channel intensity; and using images of the black region to remove flare from at least one feedback signal, wherein the feedback signal X of a color channel is determined by $$X = aV_w - bV_b$$

where $V_w$ is measured pixel intensity in the light region images, $V_b$ is measured pixel intensity in the black region images, and a and b are coefficients.

* * * * *